United States Patent
Choi et al.

(10) Patent No.: US 6,728,427 B1
(45) Date of Patent: Apr. 27, 2004

(54) METHOD OF EXTRACTING TEMPORAL AND SPATIAL COMBINATION MARKERS FOR MORPHOLOGICAL IMAGE DIVISION

(75) Inventors: Jae Gark Choi, Daejon-Shi (KR); Mun Churl Kim, Daejon-Shi (KR); Myoung Ho Lee, Daejon-Shi (KR); Chie Teuk Ahn, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/529,609

(22) PCT Filed: May 4, 1998

(86) PCT No.: PCT/KR98/00112
§ 371 (c)(1),
(2), (4) Date: Aug. 2, 2000

(87) PCT Pub. No.: WO99/21136
PCT Pub. Date: Apr. 29, 1999

(30) Foreign Application Priority Data

Oct. 16, 1997 (KR) .............................................. 97-52986

(51) Int. Cl.⁷ ................................................. G06K 9/60
(52) U.S. Cl. ....................... 382/308; 382/282; 382/284; 382/266; 382/180
(58) Field of Search .................................. 382/164, 165, 382/190, 205, 218, 251, 253, 260, 266, 274, 282, 283, 284, 295, 307, 308, 180, 107, 171, 177, 236; 358/452, 453, 450, 3.27; 348/14.15, 403, 405, 392, 513, 131, 132

(56) References Cited

U.S. PATENT DOCUMENTS

| | | | | |
|---|---|---|---|---|
| 4,791,675 A | * | 12/1988 | Deering et al. | 382/181 |
| 5,552,829 A | | 9/1996 | Kim et al. | 348/392 |
| 5,638,125 A | | 6/1997 | Jeong et al. | 348/405 |
| 5,721,692 A | * | 2/1998 | Nagaya et al. | 345/475 |
| 5,734,739 A | * | 3/1998 | Sheehan et al. | 382/128 |
| 5,974,200 A | * | 10/1999 | Zhou et al. | 382/298 |
| 6,266,442 B1 | * | 7/2001 | Laumeyer et al. | 382/190 |
| 6,434,254 B1 | * | 8/2002 | Wixson | 382/103 |

FOREIGN PATENT DOCUMENTS

EP          0 771 118        2/1997    ............ H04N/7/50

* cited by examiner

Primary Examiner—Timothy M. Johnson
Assistant Examiner—Yosef Kassa
(74) Attorney, Agent, or Firm—Cohen, Pontani, Lieberman & Pavane

(57) ABSTRACT

The present invention provides the method of extracting temporal and spatial combination markers including the steps of: (1) simplifying inputted current image frames, quantizing the simplified images, and then extracting spatial markers from the simplified and quantized image frames using spatial information; (2) extracting temporal markers from inputted current image frames and previous image frames using temporal information, and (3) combining the extracted spatial marker and the extracted temporal marker to extract temporal and spatial markers.

4 Claims, 1 Drawing Sheet

METHOD OF EXTRACTING TEMPORAL AND SPATIAL COMBINATION MARKERS FOR MORPHOLOGICAL IMAGE DIVISION

PRIORITY CLAIM

This is a U.S. national stage of application No. PCT/KR98/00112, filed on May 4, 1998. Priority is claimed on that application and on the following application. Country: Republic of Korea, Application No. 97-52986, Filed: Oct. 16, 1997.

BACKGROUND OF THE INVENTION

1. Field of the Invention

The present invention relates to a method of extracting temporal and spatial combination markers for watershed algorithms which can be used when dividing morphological images. In particular, the present invention relates to a method of extracting temporal and spatial markers for marker extraction which are used as reference regions for watershed algorithms or a region growing when dividing images using morphological tools such as morphological filters and the watershed algorithms.

2. Information Disclosure Statement

Conventional marker extraction methods for a morphological image division is to extract regions the size of which uniform in brightness is larger than given critical values as markers or extract portions in which contrast of the brightness value is large as markers, after simplifying brightness images thereof. In these conventional marker extraction methods, in case that the brightness value of static background and moving objects are similar, the markers are not extracted as dependent ones in which some portions of static background and moving objects are different each other, but are extracted as a shared one.

Therefore, when applying watershed algorithms to these extracted markers, there occurs a problem that some portions of the moving objects are divided into some of the background regions or otherwise some portions of the background regions are erroneously divided into moving objects.

SUMMARY OF THE INVENTION

It is an object of the present invention to solve the problems involved in the prior art, and to provide a temporal and spatial marker combination extraction method by which a visually meaningful marker extraction is made possible by extracting markers simultaneously using spatial and temporal information, and thus a more exact and meaningful image division is made possible when performing a morphological image division using these extracted temporal and spatial combination markers.

In order to achieve the above object, the method of extracting temporal and spatial combination markers according to the present invention comprises the steps of: (1) simplifying inputted current image frames, quantizing the simplified images, and then extracting spatial markers from the simplified and quantized image frames using spatial information; (2) extracting temporal markers from inputted current image frames and previous image frames using temporal information; and (3) combining the extracted spatial marker and the extracted temporal marker to extract temporal and spatial markers.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF THE INVENTION

Below, one preferred embodiment of the present invention will be explained in detail by reference to the accompanying drawings.

Figure 1:
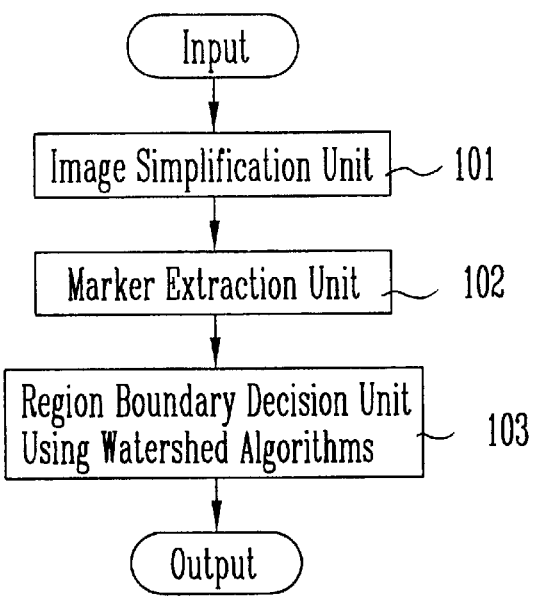
FIG. 1 is a block diagram of a morphological image division system according to the present invention.

FIG. 1 is a block diagram of a morphological image division system according to the present invention, which shows a construction of a morphological image division system using morphological filters and watershed algorithms.

First, image simplification unit 101 simplifies input images to be suitable for image segmentation and boundary information extraction. In other words, it changes a complicated shape into a simplified shape using suitable filters and removes minute variations which are not necessary for the boundary extraction.

Thereafter, marker extraction unit 102 extracts markers that are used as seed region for region growing or watershed algorithm.

Then, region boundary decision unit 103 divides the images into regions die brightness of which are similar, using the watershed algorithms from the extracted markers.

Figure 2:
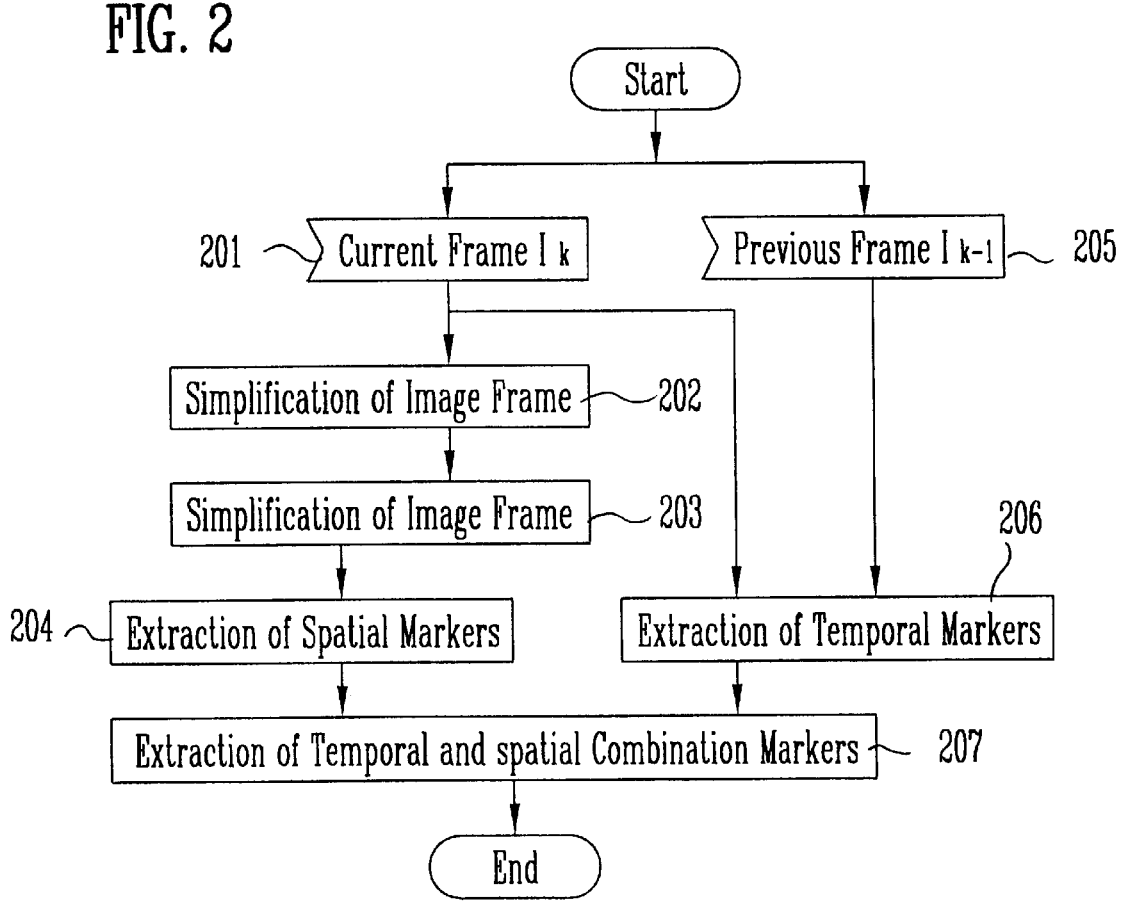
FIG. 2 is a processing flow of a temporal and spatial combination marker extraction method in a morphological image division system according to the present invention.

FIG. 2 is a processing flow of a temporal and spatial combination marker extraction method in a morphological image division system according to the present invention, in which a spatial information such as brightness information and a temporal information such as whether the temporal change of brightness values exist or not are simultaneously employed in order to extract perceptually meaningful region boundary information.

First, with respect to inputted current image frames $I_k$, images are simplified easy enough to divide them using suitable filters. At this time, the interior of the regions is simplified while keeping the boundary of the regions 201, 202.

Thereafter, in order to facilitate spatial marker extraction, gray levels of the brightness values of the simplified images are quantized 203. For example, if the brightness value of the simplified images has 256 levels ranging 0–255, it should have levels less than 256, for example 32 levels through the level quantization of the present step. The number of the quantization levels may be varied based on the types of the images and application purpose.

Then, the regions the brightness value of which is uniform are extracted from the simplified and quantized image frames 204 by means of a spatial marker. The method for extracting spatial markers is as follows. First, the simplified and quantized images are labelled using a labelling method such as Blob coloring. That is, flat connected regions the brightness of which is uniform are labelled as a single region. Of the labelled regions, only the regions the size of which is larger than a given critical value are extracted by means of the spatial marker. Accordingly, of the labelled regions, the regions the size of which is larger than a given critical value are extracted by means of the spatial marker, and the regions the size of which is less than a given critical value are defined as uncertain areas.

In addition, a change detector separates temporally changed regions and temporally unchanged regions, the current inputted image frames $I_k$ and a previous image frames $I_{k-1}$ removes uncovered regions from the temporally changed regions and divides them into moving object regions and static background regions. Then, the divided moving object regions and static background regions are shrunken, respectively, to form uncertain areas between the moving object regions and the static background regions. As a result, temporal markers are extracted which are consisted of the shrunken moving object regions, the shrunken static background regions and uncertain areas 206.

As mentioned above, after the spatial markers and the temporal markers are extracted 204, 206, temporal and spatial combination markers are extracted from the extracted spatial markers and temporal markers 207. The method for extracting the temporal and spatial combination markers is to combine spatial marker images and temporal marker images on a same image coordinate. First, with respect to respective spatial markers, all the connected moving object regions on the temporal marker images contained within respective spatial markers are extracted and then, among them, only the regions in which the size thereof is larger than a given critical value are extracted as temporal and spatial combination markers. Next, all the connected static background regions on the temporal marker images contained within respective spatial markers are extracted and then, among them, only the regions in which the size thereof is larger than a given critical value are extracted as temporal and spatial combination markers. As a result, though some of the background and the moving regions share a single spatial marker as brightness of them are similar, as the single spatial marker are separated into the markers with the static backgrounds and the markers with the moving regions through the temporal and spatial combination marker extraction process, it does not cause problems that the moving objects are erroneously divided into some of the backgrounds or adversely the backgrounds are erroneously divided into some of the moving objects. The temporal and spatial combination markers extracted from the above process are used as seed regions representing the interior of the divided regions, and the remaining regions being uncertain regions are mainly distributed around the boundary of the regions, which are allocated as most similar regions among neighboring regions through watershed algorithms.

As described above, the present invention provides the advantage capable of exactly dividing region boundaries upon application to watershed algorithm of a morphological image division, since it can extract temporal and spatial combination markers thereby to provide the interior of the regions which is temporally important, that is, markers using spatial information and temporal information simultaneously.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodiments of the present invention.

What is claimed is:

1. A method of extracting temporal and spatial combination markers applicable to a morphological image division system, comprising:
    (a) simplifying inputted current image frames to divide them using filters while preserving the boundary of regions;
    (b) quantizing gray levels of the brightness value of the simplified images so as to facilitate spatial marker extraction;
    (c) extracting the regions the brightness value of which is uniform as spatial markers from the simplified and quantized image frames;
    (d) extracting temporal markers from the inputted image frames and previous image frames using temporal information; and
    (e) combining the extracted spatial marker and the extracted temporal marker to extract temporal and spatial markers.

2. The method of extracting temporal and spatial combination markers as claimed in claim 1, the step (c) comprising:
    (c-1) labelling flat connected regions the brightness of which is uniform from the simplified and quantized images as a single region;
    (c-2) defining, among the labelled regions, the regions the size of which is less than a given critical value as uncertain areas; and
    (c-3) extracting, among the labelled regions, the regions the size of which is larger than the critical value as spatial markers.

3. The method of extracting temporal and spatial combination markers as claimed in claim 1, the step (d) comprising:
    (d-1) separating inputted current image frames and previous image frames into temporally changed regions and unchanged regions using a change region detector;
    (d-2) removing uncovered regions from the changed regions to divide them into moving object regions and static background regions; and
    (d-3) shrinking the divided moving object regions and static background regions, respectively, forming uncertain regions between the moving object regions and the static background regions, and then extracting temporal markers including the shrunken moving object regions, the shrunken static background regions and the uncertain regions.

4. The method of extracting temporal and spatial combination markers as claimed in claim 3, the step (c) comprising:
    (e-1) extracting independent moving object regions of temporal marker images contained in respective spatial markers with respect to respective spatial markers and then extracting, among them, the regions the size of which is larger than a given critical value as temporal and spatial combination markers; and
    (e-2) extracting independent static background regions of temporal marker images contained in respective spatial markers and then extracting, among them, the regions the size of which is larger than the critical value as temporal and spatial combination markers.

* * * * *